2,606,796

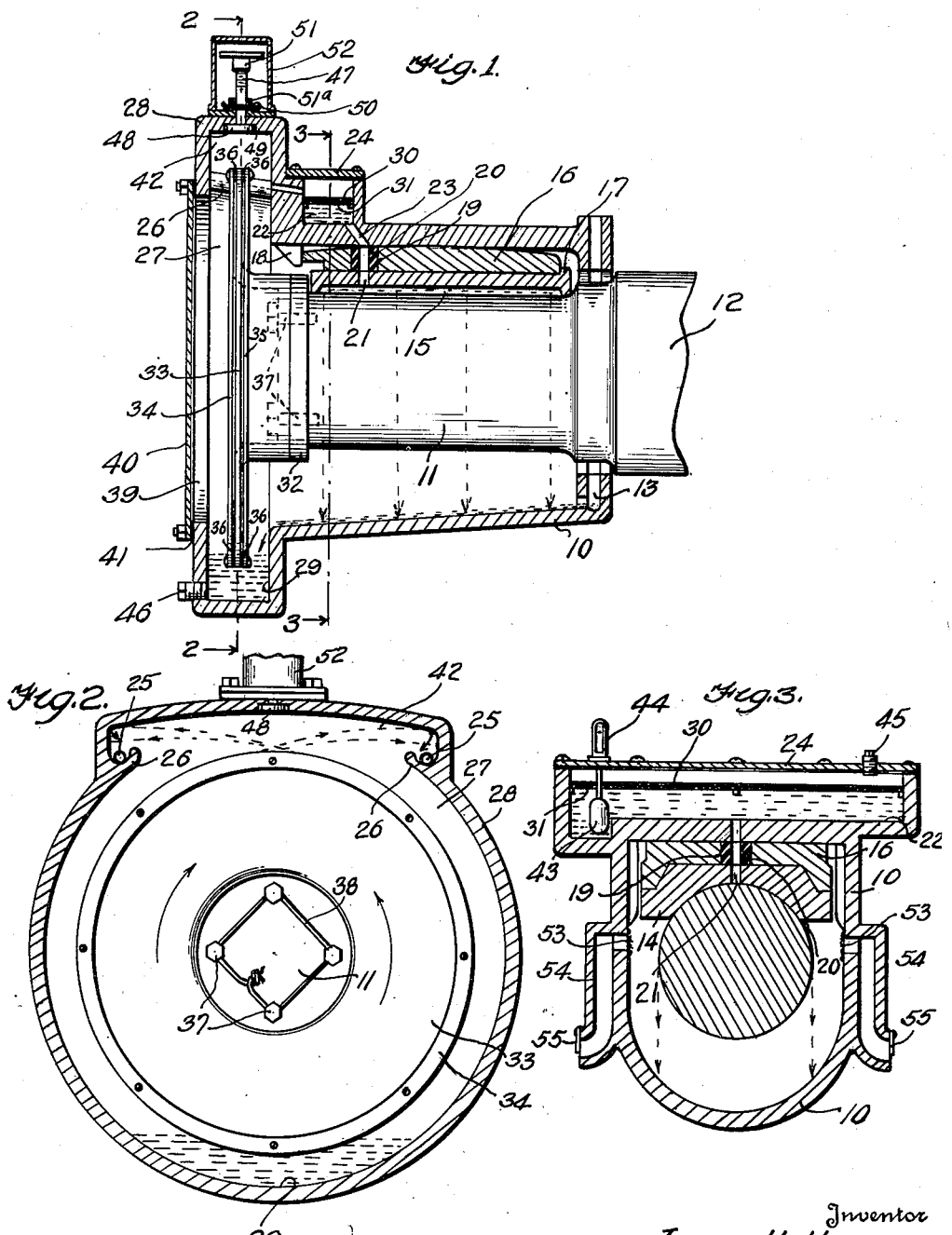
Aug. 12, 1952     J. H. HELMS     2,606,796
CENTRIFUGAL FLOW SELF-LUBRICATING JOURNAL BOX AND BEARING
Filed May 28, 1948
Inventor
JOHN H. HELMS
By Irving A. McCathran
HIS ATTY Patented Aug. 12, 1952

UNITED STATES PATENT OFFICE 2,606,796

CENTRIFUGAL FLOW SELF-LUBRICATING JOURNAL BOX AND BEARING

John H. Helms, Fortville, Ind.

Application May 28, 1948, Serial No. 29,774

1 Claim. (Cl. 308—86)

This invention relates to a centrifugal flow self-lubricating journal box and bearing, and has for one of its objects the production of a simple and efficient means for automatically distributing oil through the bearings within a journal box and thereby provide efficient lubrication at various climate temperatures, as well as at various speeds whether high or low.

Another object of this invention is the production of an efficient journal box and bearing lubricating means, which is so constructed as to avoid frequent repairs.

Other objects and advantages of this invention will appear throughout the following specification and claim.

In the drawing:

Figure 1 is a longitudinal sectional view of the journal box and bearings;

Figure 2 is a vertical sectional view taken on line 2—2 of Figure 1;

Figure 3 is a vertical sectional view taken on line 3—3 of Figure 1.

By referring to the drawing, it will be seen that 10 designates the casing of the journal box through which the journal 11 of the axle 12 extends, as shown in Figure 1. The conventional entrance 13 for a dust guard is provided at the inner end of the casing 10. A journal brass bearing 14 rests upon the journal 11 and is provided with a longitudinally extending oil groove 15 in its under face abutting upon the journal 11. This groove 15 is closed at its ends, as shown in Figure 1. A conventional journal box wedge 16 rests upon the bearing 14 and is oval upon its top, as shown to insure proper bearing on the journal. The wedge 16 is held against longitudinal movement in one direction by a lug 17 at one end of the bearing 14, and against movement in the opposite direction by a lug 18 carried by the casing 10. The wedge 16 is provided with a lubrication port 19 in which is fitted a hollow rubber gasket 20 defining a rubber encased port which communicates with the port 21 formed in the bearing 14 and leading to the groove 15. The gasket 20 may be of any suitable type to properly seal the ports and direct the oil to the groove 15 while the journal and surrounding parts are under constant movement or vibration.

The casing 10 is provided with a transversely extending oil reservoir 22 located above the ports 19 and 21. A passageway 23 leads from the reservoir 22 to the hollow gasket 20 and port 21 to feed oil to the channel 15. A removable cover plate 24 closes the top of the reservoir 22 and a plurality of oil feed ports 25 lead to the reservoir from the oil ledges 26 of the centrifugal oil delivering chamber 27. The chamber 27 is formed within the enlarged substantially circular housing 28 formed at the forward end of the casing 10, as shown in Figure 1. This housing 28 and chamber 27 extend below the bottom of the casing 10, thereby defining an oil pit 29 into which the oil drains after passing over the bearing 10 from the reservoir 22, ports 23, 20 and 21. The reservoir 22 is preferably provided with a filter cloth 30 and a filter screen plate 31 upon which the cloth rests to filter the oil before the oil passes through the port 21 to the groove 15 and journal 11.

The journal 11 is provided with an end flange 32 to which is secured an oil distributing disc 33. Oil pick-up rings 34 and 35 made of plywood, sponge, felt, rubber, or similar material, are secured to opposite sides of the disc 33 and are slightly spaced therefrom by suitable spring washers 36. The disc 33 is secured to the flange 32 by means of cap screws 37, which screws are tied together by tie-wire 38. The disc 33 and rings 34 and 35 extend down into the oil within the oil pit 29, as shown in Figure 1, to pick up the oil as the disc 33 rotates with the journal 11. The housing 28 is provided with an access opening 39 which is normally closed by a cover plate 40 and sealed by a suitable gasket 41.

The ledges 26 are located upon opposite sides of the housing 28 at the top thereof within the widened compartment 42. This compartment 42 is located above the disc 33 and chamber 27. The ledges 26 are adapted to receive the oil from the disc 33 and rings 34 and 35, as the disc 33 rotates, and the oil which is picked up from the oil pit 29 is thrown upon one of the ledges 26 by centrifugal force as the disc 33 rotates. The oil will be thrown upon the opposite edge 26 when the disc 33 rotates in the opposite direction. The oil will drain through the ports 25 from the ledges 26 into the reservoir 22 where it is filtered and then fed to the bearing as above described.

As shown in Figure 3, an oil float 43 is mounted within the reservoir 22 and actuates a conventional oil gage 44 mounted upon the cover plate 24. An oil filling plug 45 is carried by the plate 24 to facilitate refilling of the reservoir 22 by suitable means, if desired. The oil pit 29 is also provided with a removable drain plug 46.

A graduated wear gage staff 47 extends vertically through the central axis of the housing 28 and its lower end carries a foot disc 48. This disc normally fits in the recess 49 in the top of the compartment 42 and normally is held in this position by means of a cotter pin 50 shown in Figure 1. An adjusting nut 51 is threaded upon the upper end of the staff 47. A removable housing 52 fits over the staff to shield the same. The wear on the journal brass 14 may be measured by removing the cotter pin 50 and pushing the staff 47 downwardly until the foot disk 48 strikes the top of the boss 51a. The staff or plunger 47 is then raised and the cotter pin or key 50 is replaced. After considerable wear has resulted on the journal brass bearing 14, the cotter pin 50 again is removed and the wear on the journal bearing may be measured on the wear gage by consulting the position of the nut 51 relative to the graduated staff 47.

It should be noted that the disc 33 rotates with the journal 11, either in a forward or backward direction. As this rotation takes place, the disc 33 and the rings supported thereby, pick up the oil from the oil pit 29 and throw the oil upon one of the ledges 26 by centrifugal force, as indicated in Figure 1. The oil is then passed to the reservoir and then to the journal as above described. The warm oil then returns to the pit 29 where the oil again is picked up by the disc 33 and cooled as the disc rotates. This procedure continues and thereby completely lubricates the journal. The disc 33 handles the oil so rapidly that the reservoir is continually full. When the journal 11 discontinues rotation, the brass bearing 14 acts as a valve to keep the oil from flowing unless the journal is in rotation. The gasket 20 seals the top part of the port in the brass bearing 14 and also the under face of the top wall of the journal casing or box 10 adjacent the port 23 against which rests the wedge 16 to avoid leakage. Consequently, when the journal 11 begins rotation the reservoir is always full.

It should be noted that the bearing 14 is lined with Babbitt metal (about ⅜ inch thick) where it contacts the journal 11. This is conventional. When this Babbitt metal is worn from the bearing, it may be relined, thereby increasing the life of the bearing. The housing 28 is much larger than the distributor to allow for shuttle motion when the train carrying the bearing hits high and low spots on the tracks. By means of this device, the necessity of repacking the journal box is avoided and because of the constant lubrication of the journal by clean cool oil, the parts will not run hot. This device avoids waste grabs and avoids the journal being cut from waste grabs. It also avoids the necessity of waste adjustments and eliminates the necessity of constant journal inspection and replacement of waste.

A fine screen 53 is placed over the inner end of each breather passage 54, and an oval or other shield plate 55 of any suitable type, preferably partly closes the lower opening of each passage 54, as shown in Figure 3. The breather or air passages keep the journal box cool regardless of which way the vehicle may be moving.

It of course would fall within the scope of the present invention to place the wear gage in any desired position to measure the wear by contact with the journal 11 if desired, rather than in the position shown. This may be done without departing from the spirit of the invention. It should be understood that other detail changes of location of parts may be necessary to accommodate various types of journal box to which the device may be applied.

Having described the invention, what is claimed as new is:

A device of the class described comprising a journal casing, a journal rotatably mounted therein, a disc carried by the journal, said casing having an oil pit for receiving oil from the journal, said disc projecting into the pit for elevating oil by centrifugal force therefrom as the journal rotates, said disc having relatively narrow oil pick-up rings formed of relatively soft material slightly spaced laterally from said disc and secured to opposite sides of the disc near the periphery of the disc to pick up a maximum amount of oil as the disc rotates through the oil pit, oil receiving means carried within the casing to receive oil thrown from the disc by centrifugal force as the disc rotates, and means for feeding oil from the oil receiving means to the journal.

JOHN H. HELMS.

REFERENCES CITED

The following references are of record in the file of this patent:

UNITED STATES PATENTS

| Number | Name | Date |
| --- | --- | --- |
| 158,169 | Hall | Dec. 29, 1874 |
| 503,074 | Conway | Aug. 8, 1893 |
| 612,653 | Witkowski | Oct. 18, 1898 |
| 889,999 | Wilcox | June 9, 1908 |
| 1,375,376 | Fynn | Apr. 19, 1921 |
| 1,439,321 | Page | Dec. 19, 1922 |
| 1,905,281 | Grandjean | Apr. 25, 1933 |
| 2,264,908 | Blackmore | Dec. 2, 1941 |
| 2,498,520 | Blackmore | Feb. 21, 1950 |

FOREIGN PATENTS

| Number | Country | Date |
| --- | --- | --- |
| 15,009 | Great Britain | 1906 |
| 21,085 | Great Britain | 1908 |